United States Patent
Wilbur et al.

(10) Patent No.: US 11,088,835 B1
(45) Date of Patent: Aug. 10, 2021

(54) CRYPTOGRAPHIC MODULE TO GENERATE CRYPTOGRAPHIC KEYS FROM CRYPTOGRAPHIC KEY PARTS

(71) Applicant: Hologram, Inc., Chicago, IL (US)

(72) Inventors: Patrick Floyd Wilbur, Potsdam, NY (US); Reuben Balik, Chicago, IL (US)

(73) Assignee: Hologram, Inc., Chicago, IL (US)

( * ) Notice: Subject to any disclaimer, the term of this patent is extended or adjusted under 35 U.S.C. 154(b) by 13 days.

(21) Appl. No.: 16/110,235

(22) Filed: Aug. 23, 2018

Related U.S. Application Data

(60) Provisional application No. 62/549,114, filed on Aug. 23, 2017.

(51) Int. Cl.
  *H04L 29/06* (2006.01)
  *H04L 9/08* (2006.01)
  *G06F 7/58* (2006.01)
  *H04L 9/16* (2006.01)

(52) U.S. Cl.
  CPC .............. *H04L 9/0861* (2013.01); *G06F 7/58* (2013.01); *H04L 9/0816* (2013.01); *H04L 9/16* (2013.01)

(58) Field of Classification Search
  None
  See application file for complete search history.

(56) References Cited

U.S. PATENT DOCUMENTS

| | | | | |
|---|---|---|---|---|
| 8,385,553 | B1* | 2/2013 | Jooste | H04L 9/0822 380/277 |
| 2010/0306538 | A1* | 12/2010 | Thomas | H04L 9/0844 713/168 |
| 2013/0315393 | A1* | 11/2013 | Wang | H04W 12/04 380/270 |
| 2016/0294794 | A1* | 10/2016 | Mancic | H04L 63/061 |
| 2018/0288092 | A1* | 10/2018 | Linsky | H04L 9/3242 |

* cited by examiner

Primary Examiner — Andrew J Steinle
(74) Attorney, Agent, or Firm — Cooley LLP

(57) ABSTRACT

A cryptographic module has an input/output port to receive a first temporary key. A processor receives the first temporary key from the input/output port. A secure authentication key memory is connected to the processor. A temporary key generator is connected to the processor to produce a second temporary key for routing to the input/output port. A cryptographic salt generator is connected to the processor to produce cryptographic salt. A cryptographic key generator is connected to the processor to process key parts derived from the first temporary key, the second temporary key and the cryptographic salt to produce cryptographic keys.

10 Claims, 1 Drawing Sheet

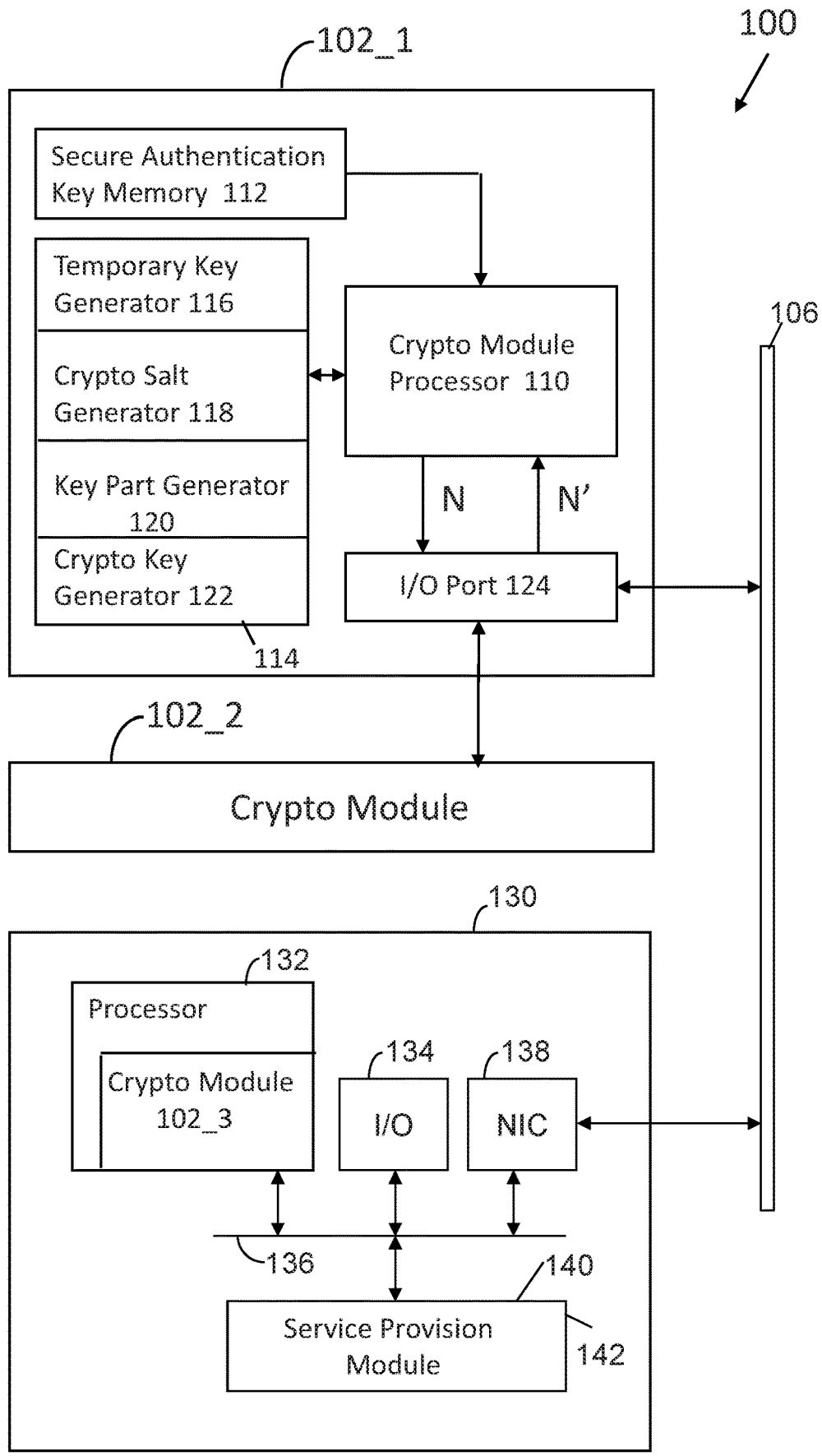

CRYPTOGRAPHIC MODULE TO GENERATE CRYPTOGRAPHIC KEYS FROM CRYPTOGRAPHIC KEY PARTS

CROSS-REFERENCE TO RELATED APPLICATION

This application claims priority to U.S. Provisional Patent Application Ser. No. 62/549,114, filed Aug. 23, 2017, the contents of which are incorporated herein by reference.

FIELD OF THE INVENTION

This invention relates generally to digital security. More particularly, this invention relates to a cryptographic module to generate cryptographic keys from cryptographic key parts.

BACKGROUND OF THE INVENTION

Making communications secure and private relies upon establishing trust and, typically, non-compromised communications channels. Secure and private communications relying upon cryptographic technologies depend upon the establishment and agreement of identifying information (e.g., identity or authentication keys) and/or cryptographic keys (e.g., data encryption keys) between all communicating parties. Key establishment, key replenishment, and establishment of identifying information continue to prove to be difficult to perform securely, where initial key/information establishment and subsequent key replenishment are often burdensome, costly, and can also be vulnerable to compromise. Additionally, key establishment/replenishment and agreement methods still rely upon already-established trust and/or non-compromised channels of communication in order to be effective, and establishing both trust and non-compromised communications channels itself is difficult, and itself is a problem to solve.

Symmetric key encryption relies upon secure initial key exchange, and all subsequent key replenishment to be secure; otherwise, its communications can be compromised if the key is known by an unauthorized third-party, and in some cases its previous communications, if recorded, can later be compromised should previously-exchanged or previously-replenished keys be compromised. Asymmetric key encryption provides an alternative to purely-symmetric key encryption, where a public key can be disclosed publicly and even over an insecure medium (susceptible to eavesdroppers), but without compromising plaintext encrypted using the public key, assuming that the corresponding private key remains securely stored and maintained; however, asymmetric key encryption can require more computation and/or more memory when compared to purely-symmetric key encryption, thus suffering from performance issues. Furthermore, if more than one plaintext is encrypted using the same public/private key pair, and the private key is later compromised, all prior communications that had previously been intercepted and recorded can be compromised; thus, without the use of other additional methods, there is no perfect forward secrecy.

A common strategy to accommodate the weaknesses of both purely-symmetric key encryption and purely-asymmetric key encryption is to adopt both symmetric and asymmetric key encryption within a single protocol's encryption method. Secure Socket Layer (SSL) and Transport Layer Security (TLS), for example, as well as technologies built upon them (e.g., HTTPS), utilize asymmetric key encryption for the purpose of performing secure key exchange, where one party in a communication (e.g., Alice) generates a random ephemeral session key and securely sends that ephemeral session key to another party (e.g., Bob) using Bob's asymmetric public key. In SSL, TLS, and similar technologies, Bob then decrypts the random ephemeral session key (e.g., data encryption key or key-agreement key) using Bob's asymmetric private key, and Alice and Bob encrypt and decrypt plaintext using a mutually-agreeable symmetric key cipher algorithm where the random ephemeral session key is used as the symmetric key. This approach allows for secure key exchange using a relatively inefficient asymmetric cipher, followed by encryption using a more efficient symmetric cipher based on the temporary random key.

The handshaking step in methods like SSL and TLS, where the ephemeral key exchange is performed and key agreement is reached, introduces a lot of overhead in terms of the amount of data transferred. While TLS can be configured to allow sessions to be resumed across multiple connections, these are still prone to timing out and thus requiring a full handshake all over again. As such, across subsequent messages, as well as over longer periods of inactivity or a state of being disconnected, protocols like SSL and TLS (as well as HTTPS) are not efficient due to their repeated need for handshaking.

Additionally, methods like SSL and TLS, which combine asymmetric key encryption with symmetric key encryption and ephemeral session keys, can still be prone to man-in-the-middle attacks. As a result, the trust model requires some form of independent certification or independent verification of the authenticity of a recipient's public key in order to determine that the party who possesses the corresponding private key to a given public key is, in fact, the intended recipient. Using third-party independent certification and verification authorities, such as certificate authorities, depends upon first establishing trust and/or a non-compromised communications channel with such authorities.

Lastly, both symmetric key encryption, asymmetric key encryption, and combined approaches depend upon some way for a recipient to verify the identity of a sender of a message (or an initiator of a connection). These approaches require identifying information (e.g., user identifier, device identifier, passcode, etc.) and/or an identifying key (used, e.g., in cryptographic signing, HMAC, or similar methods) to be securely established on a system in use by the sending/initiating entity, as well as the corresponding identifying information or identifying key to be securely established on a system in use by the party responsible for verifying the sending/initiating entity's identity.

Thus, there is a need for improved cryptographic key generation techniques.

SUMMARY OF THE INVENTION

A cryptographic module has an input/output port to receive a first temporary key. A processor receives the first temporary key from the input/output port. A secure authentication key memory is connected to the processor. A temporary key generator is connected to the processor to produce a second temporary key for routing to the input/output port. A cryptographic salt generator is connected to the processor to produce cryptographic salt. A cryptographic key generator is connected to the processor to process key parts derived from the first temporary key, the second temporary key and the cryptographic salt to produce cryptographic keys.

BRIEF DESCRIPTION OF THE FIGURES

The invention is more fully appreciated in connection with the following detailed description taken in conjunction with the accompanying drawings, in which:

FIG. 1 illustrates a system configured in accordance with an embodiment of the invention.

Like reference numerals refer to corresponding parts throughout the several views of the drawings.

DETAILED DESCRIPTION OF THE INVENTION

FIG. 1 illustrates a system 100 configured in accordance with an embodiment of the invention. The system 100 includes a first cryptographic module 102_1, a second cryptographic module 102_2 and a third cryptographic module 102_3. Each cryptographic module has the same components, which for convenience, are only detailed in cryptographic module 102_1. Cryptographic module 102_1 is a standalone cryptographic chip, such as a Smartcard or a Subscriber Identification Module (SIM) card. Cryptographic module 102_2 may be incorporated into a larger electronic system, such as a point of sale (POS) system. Cryptographic module 102_3 is a segment of a general purpose processor.

Cryptographic module 102_1 includes a cryptographic processor 110 connected to a secure authentication key memory 112. The cryptographic processor 110 is also connected to a memory 114. In one embodiment, the memory 114 includes instructions executed by the cryptographic processor 110 to implement various functional blocks, such as a temporary key generator 116, a cryptographic salt generator 118, a key part generator 120 and a cryptographic key generator 122. In other embodiments, one or more of the functional blocks may be implemented in silicon.

The secure authentication key memory 112 is a tamper-proof memory that stores one or more authentication keys utilized by the cryptographic module processor 110 to initiate a key generation process. In one embodiment, the temporary key generator 116 is a random number generator used to generate a key or nonce N, which is passed to I/O port 124 for delivery to another cryptographic module. For example, I/O port 124 may include contact pads for engagement with contact pads associated with cryptographic module 102_2. Alternately, I/O port 124 may be a wireless interface for connection to network 106, which may be any combination of wired and wireless networks. Network 106 is used to communicate with server 130.

Server 130 includes a general purpose processor 132 with a cryptographic module 102_3. The server also includes input/output devices 134 connected to a bus 136. The input/output devices 134 may include a keyboard, mouse, touch display and the like. A network interface circuit 138 is also connected to the bus 136 to provide connectivity to network 106. A memory 140 is also connected to the bus. The memory 140 stores a service provision module 142, which includes instructions executed by processor 132 to coordinate the supply of a network service in the event of a successful authentication operation between cryptographic module 102_1 and cryptographic module 102_3.

The I/O port 124 receives a temporary key N' from another cryptographic module, such as 102_2 or 102_3. The two cryptographic keys N and N' are processed by the key part generator 120 to produce cryptographic key parts, as detailed below. In one embodiment, the key part generator 120 uses cryptographic salt from cryptographic salt generator 118.

The key part generator 120 need not be resident on cryptographic module 102_1. The remaining components of the cryptographic module 102_1 need to be cryptographically secure, but the key part generator 120 may be implemented on an external computation resource, such as server 130, with the resultant key parts being delivered to I/O port 124. The cryptographic key generator 122 processes the key parts to produce cryptographic keys.

The disclosed system performs key exchange as often as is needed by set policy (e.g., key expiration or a set crypto period), and can be used to generate either static keys, or can be used to generate ephemeral session keys (e.g., data encryption keys, keys used for identification or authentication, or other keys or cryptographic information). Static keys are agreed upon by both a first user (e.g., Alice) and a second user (e.g., Bob) through computation done in parallel by both Alice and Bob, and without the need to perform key exchange or key replenishment over-the-air (across any communications channel). Ephemeral session keys (e.g., data encryption keys, keys used for identification or authentication, or other keys or cryptographic information) are able to be computed by both Alice and Bob without the need to transmit an ephemeral session key with each session and/or each message. This reduces the data transfer overhead and latency associated with handshaking in other protocols, reduces the computational resources required, makes frequent key replenishment and one-time pads/passcodes less burdensome and costly, makes interception by an eavesdropper of the key agreement protocol more difficult since key agreement does not happen over a communications channel between Alice and Bob, and enables secure and private communications. The disclosed technique may be used over any communications transport, network technology, or radio access technology.

The invention is disclosed in the context of two parties, Alice and Bob, engaging in communication. However, the disclosed techniques may be used in connection with communications between more than two parties.

The term "Identity Verification Agent" refers to a component responsible for confirming the identity of another party/entity. Alice and Bob may each contain a local Identity Verification Agent, may utilize a remote Identity Verification Agent, or one party may utilize a local Identity Verification Agent, while the other party utilizes a remote Identity Verification Agent. One or both Identity Verification Agents can be maintained by an independent third-party.

The term "Privacy Agent" refers to the component responsible for encryption and/or decryption of messages to/from another party/entity. Alice and Bob may each contain a local Privacy Agent, may utilize a remote Privacy Agent, or one party may utilize a local Privacy Agent while the other party utilizes a remote Privacy Agent. One or both Privacy Agents can be maintained by an independent third-party. The Privacy Agent utilizes one or more data encryption keys or transport keys to create a private encrypted context (end-to-end transport or tunnel) between Alice and Bob.

The term cryptographic module refers to the component responsible for establishing and maintaining trust between parties, an example of which is defined in NIST Special Publication 800-57 Part 1 Revision 4 (DOI 10.6028/NIST.SP.800-57pt1r4). The cryptographic module contains identifying information, as well as cryptographic keys. The cryptographic keys contained within the cryptographic module are used to generate static cryptographic keys, one-time ephemeral session keys, static identifying keys, and/or one-time ephemeral session keys (or one-time passcodes). The cryptographic module implementation may utilize purely software (a library, an applet, an API, a service, a microservice, a software implementation of a Subscriber Identity Module or software SIM, etc.), purely hardware (Subscriber Identity Module or SIM, Universal Integrated Circuit Card or UICC, eSIM, Smart Card, Trusted Platform Module, etc.), or a combination of the two (software and hardware, e.g., security-hardened hardware).

Each Identity Verification Agent makes use of a cryptographic module containing corresponding keys to that of a sender/initiator's cryptographic module in order to verify identity of a sender/initiator. Each Privacy Agent makes use of a cryptographic module to generate the necessary keys to perform cryptographic functions on data and information being transported.

Multiple methods of communication are possible between Alice and Bob. An example sequence of events that allow Alice and Bob to engage in trusted communication include the following:

1. Cryptographic Module Provisioning: If the cryptographic module has not yet been provisioned, Cryptographic Module Provisioning is performed first.
2. If identity verification for communications from Alice to Bob is required by mutually-agreeable communications policy:
    a) Alice performs Identity Information Generation using Alice's cryptographic module.
    b) Alice sends the identify information generated from Identity Information Generation to Bob.
    c) Bob verifies Alice's identity using Bob's Identity Verification Agent.
3. If encryption for communications from Alice to Bob is required by mutually-agreeable communications policy:
    a) Bob optionally generates and communicates a nonce and/or sequence number to Alice.
    b) Alice performs Transport Key Generation using Alice's cryptographic module.
    c) Alice optionally generates and communicates a nonce and/or sequence number to Bob.
    d) Alice encrypts the plaintext message and any necessary identifying information, and communicates the encrypted message and identifying information to Bob.
    e) Bob performs Transport Key Generation using Bob's cryptographic module containing key-agreement keys that correspond to the key-agreement keys used by Alice's cryptographic module.
    f) Bob decrypts the message using the keys generated by Transport Key Generation using Bob's cryptographic module.

Alternatively, identity information generated in 2.*a*. may be encrypted and sent within the message, as in 3.*c*., instead of being sent in plaintext form. An example of a simple use case is where the owner of server 130, say Bob, supplies cryptographic module 102_1 (e.g., a SIM card) to Alice. Since Bob distributed the module, he has knowledge of the information in the secure authentication key memory 112. Therefore, Bob can authenticate Alice after that information is delivered from cryptographic module 102_1 to cryptographic module 102_3 of server 130.

Cryptographic Module Provisioning happens for both Alice's cryptographic module, as well as Bob's cryptographic module. Cryptographic Module Provisioning of both cryptographic modules establishes necessary trust between Alice's cryptographic module and Bob's cryptographic module by establishing corresponding cryptographic key-agreement keys in both cryptographic modules.

Cryptographic Module Provisioning may be performed by generating keys and transferring software and keys over an existing secured channel, provisioning and physically transporting secure hardware modules containing keys, or some combination of both. Examples of provisioning and physically transporting secure hardware modules include the use of Subscriber Identity Modules (SIM), Smart Cards, UICC, eSIM, Trusted Platform Modules, and similar secure hardware modules capable of performing a one-way function in order to satisfy the purposes of the Key Part Generation Function. Examples of transferring software/keys over an existing secured channel include use of applets, software-SIM, eSIM, similar secure software transfer methods, and cryptographic keys transferred over any already-secure channel, including the use of cryptographic modules to create an already-secure and already-private bootstrapping channel to then be used to establish agreement of such software and/or keys for subsequent use by the application (that is, by Alice and Bob).

Depending upon the identity verification method(s) chosen, there may be a need to generate any or all of the following: static keys or information used for identification, authentication, or authorization purposes and one-time ephemeral session keys or one-time passcodes to be used for identification, authentication, or authorization purposes. To generate static keys used for identification purposes, the Key Generation procedure is performed. To generate one-time passcodes for identification purposes using a time-based approach, the Key Generation procedure is performed, for example, using temporary key generator 116. Cryptographic salt from the cryptographic salt generator 118, such as a current time, may also be used. To generate one-time passcodes for identification purposes using a sequence number approach, the Key Generation procedure is performed with sequence number and optional nonce(s) as Key Generation Inputs. The sequence number may be maintained by the cryptographic salt generator 118. Otherwise, one-time passcodes for identification purposes may be generated using only nonce(s) as Key Generation Inputs. The output of the Key Generation procedure may optionally be truncated as appropriate for a given application.

Depending upon the encryption method(s) chosen, there may be a need to generate any or all of the following: static keys used for encryption/decryption purposes, static keys used for integrity purposes, and ephemeral session keys used for encryption/decryption keys and/or for integrity purposes. To generate static keys used for encryption/decryption, the Key Generation procedure is performed. To generate one-time pads for encryption/decryption using a time-based approach, the Key Generation procedure is performed with current time and optional nonce(s) as Key Generation Inputs. To generate one-time pads for encryption/decryption using a sequence number approach, the Key Generation procedure is performed with sequence number and optional nonce(s) as Key Generation Inputs. Otherwise, one-time pads for identification purposes may be generated using only nonce(s) as Key Generation Inputs. These one-time ephemeral session keys may be used for any suitable encryption and decryption algorithm.

Keys can be generated for initial key establishment, key replenishment, and/or one-time ephemeral key establishment, for any type of cryptographic key or information, as often as is needed by the encryption/decryption method(s) chosen.

Once Cryptographic Module Provisioning has occurred, key agreement has been established between the cryptographic module accessible by Alice and the additional cryptographic module accessible by Bob. The corresponding key-agreement keys (e.g., N and N' of FIG. 1) inside both Alice's cryptographic module and Bob's cryptographic module are then used to generate key parts (key components) for any type of cryptographic keys, cryptographic keying material, or cryptographic information needed by the cryptographic method(s) chosen.

Before the Key Part Generation Function is used, a Key Generation Input Conditioning Function may be used, as implemented by the key part generator 120. This approach protects against an attacker using carefully-chosen inputs to try to compromise the system and/or as part of a perfect forward secrecy method implementation. Inputs to the Key Part Generation Input Conditioning Function, as implemented by the key part generator 120, may include one or more of the following:

- N: Nonce generated by Bob (if ephemeral session keys and/or one-time passcodes are used); the Nonce may be generated by the temporary key generator 116
- N': Nonce generated by Alice (if ephemeral session keys and/or one-time passcodes are used)
- T: Current time (if time-based ephemeral session keys and/or time-based one-time passcodes are used) operative as cryptographic salt from cryptographic salt generator 118
- S: Sequence number (if ephemeral session keys and/or one-time passcodes are used) operative as cryptographic salt from cryptographic salt generator 118

If a Key Generation Input Conditioning Function is chosen to alter the inputs, then another nonce (N'), and one or more forms of cryptographic salt (e.g., the current time (T) and/or the sequence number (S)), and/or static identifying keys or information are used to alter the nonce generated by Bob (N) and produce conditioned inputs as to the Key Part Generation Function. The Key Part Generation Input Conditioning Function may be implemented using a Message Authentication Code (MAC) or keyed-hashing method (e.g. HMAC), simple mathematical transform or operation (e.g. XOR), or other method. The Key Generation Input Conditioning Function may be implemented either inside or outside of the cryptographic module 102_1.

The inputs to the Key Part Generation Function (e.g., Cryptographic Key Generator 122) are the outputs from the Key Part Generation Input Conditioning Function (e.g., Key Part Generator 120). If conditioning is not desired, the Key Generation Input Conditioning Function may be substituted for a function whose outputs are identical to its inputs or may be a simple concatenation of its inputs; alternatively, the Key Part Generation Input Conditioning Function Inputs may be used as Key Part Generation Function inputs directly.

The sequence number (S), if used, may constitute either a sequential counter, a less predictable cryptographic one-way function or hash (e.g., a MAC or keyed-hash function influenced by the sequence numbers and MACs/hashes of all previous sequential messages), or a combination of the two.

The Key Part Generation Function implemented by the cryptographic key generator 122 is any appropriate mathematical one-way function (e.g., MAC or keyed-hashing function) in which the same set of Key Part Generation Inputs produces the same mathematically derived output, and for which a mathematical inverse for that function either does not exist, is unknown, or is sufficiently hard to determine.

The Key Part Generation Function associated with the cryptographic key generator 122 resides within each software and/or hardware implementation of the cryptographic module. It is the responsibility of the cryptographic module to generate the cryptographic keys required by the application.

In both identification and encryption/decryption, it may be necessary to generate multiple key parts (e.g., for extending overall key length, for multiple rounds of encryption/decryption, for encrypting parts of messages to be each decrypted by different recipients, etc.). Multi-part Key Generation is made possible by repeatedly calling the Key Part Generation Function with different elements from a set of multiple Key Part Generation Inputs.

Optional Message Integrity Verification is made possible through any appropriate integrity assurance method (e.g., cryptographic signing, MAC or keyed-hashing, etc.). To perform Message Integrity Verification:

1. Alice performs Identifying Information Generation to generate a key to be used for integrity assurance purposes.
2. Alice utilizes the generated key to assure the integrity of the message (e.g., for keyed HMAC, Alice uses the generated key and message as inputs to an appropriate HMAC method).
3. Alice communicates the integrity assurance information (e.g., HMAC result) to Bob.
4. Bob performs the same Identifying Information Generation to generate a key.
5. Bob verifies the integrity assurance method produces integrity assurance information that corroborates Alice's communicating integrity assurance information.

Integrity assurance information (e.g., HMAC result) may be communicated by Alice to Bob in unencrypted or encrypted form, depending upon application appropriateness.

Various protocol options for use during communications can be negotiated between Alice and Bob, depending upon the availability of each option within each entity's protocol implementation. Any mutually-supported asymmetric key encryption algorithm, symmetric key encryption algorithm, or other encryption algorithm may be used for establishing secure and private communication. Depending upon the encryption algorithm selected, generated static cryptographic keys, generated replenished cryptographic keys, and/or generated one-time pads as cryptographic ephemeral keys produced by the disclosed method may be used, including multiples of each.

An implementation may choose to utilize additional identifying information, identifying keys, and/or cryptographic keys, as well as additional stages and forms of establishment or replenishment, as an application requires.

One-time pads, one-time passcodes, and some integrity preservation methods require a hashing (e.g., HMAC) algorithm to be used, and any mutually-agreeable cryptographic hashing algorithm may be used that satisfies the application requirements. Any key length that can be supported by the encryption algorithm(s) chosen may be used. Any padding scheme that transforms data from original length into a length that is aligned with lengths that are acceptable by the encryption algorithm chosen (e.g., PKCS7 for AES encryption) may be used.

Compression is common in networking and Internet communications; similarly, an implementation may incorporate compression on pre-encrypted data and/or post-encrypted data (or the entire final message itself sent from Alice to Bob). In order to minimize the amount of data transferred, sessions may be supported where authentication of Alice occurs in the first transmission to Bob but not with every subsequent transmission, according to mutually-agreeable policy.

Perfect forward secrecy can be enabled if mutually supported by both Alice and Bob. In the case that the perfect forward secrecy option is enabled, an additional (random) ephemeral session key is conveyed whenever authentication information is conveyed, which is upon the start of either each transmission or each session (depending upon the connection persistence option as described, above). In the case where the perfect forward secrecy option is enabled, the conveyance of an additional random ephemeral session key increases the overall amount of data to be transferred; however, the reduction of key exchange handshaking (like in other protocols, where handshaking is either per-transmission or per-session) still realizes an overall reduction in transferred data compared to other protocols.

Any mutually-agreeable integrity checking algorithm (e.g., checksum, Cyclic Redundancy Check, Block Hash, or similar technique) may be used and attached to messages from Alice to Bob, and Bob may likewise send a confirmation of integrity and/or success to Alice in a mutually-agreeable fashion.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A cryptographic module, comprising:
   an input/output port to receive a first temporary key in a first communication exchange with another machine to initiate an authentication operation;
   a processor to receive the first temporary key from the input/output port;
   a secure authentication key memory connected to the processor;
   a temporary key generator connected to the processor to produce a second temporary key for routing to the input/output port;
   a cryptographic salt generator connected to the processor to produce cryptographic salt;
   a cryptographic key generator connected to the processor to process key parts derived from the first temporary key, the second temporary key and the cryptographic salt to complete the authentication operation and produce cryptographic keys without a second communication exchange with another machine.

2. The cryptographic module of claim 1 configured as a standalone cryptographic chip.

3. The cryptographic module of claim 1 operative as a segment of a general purpose processor.

4. The cryptographic module of claim 1 wherein the input/output port has physical contacts.

5. The cryptographic module of claim 1 wherein the input/output port is a wireless interface.

6. The cryptographic module of claim 1 wherein the temporary key generator is a random number generator.

7. The cryptographic module of claim 1 wherein the cryptographic salt generator secures a common time stamp associated with the first temporary key and the second temporary key.

8. The cryptographic module of claim 1 wherein the cryptographic salt generator utilizes a sequence number.

9. The cryptographic module of claim 1 wherein the key parts are received at the input/output port from an external computation resource.

10. The cryptographic module of claim 1 wherein the key parts are computed by the cryptographic module.

* * * * *